United States Patent [19]
Kay et al.

[11] Patent Number: 5,757,894
[45] Date of Patent: May 26, 1998

[54] VIRTUAL FOREIGN EXCHANGE SERVICE

[75] Inventors: William A. Kay, Glendora, N.J.; Alita M. Parker, Springdale, Md.

[73] Assignee: Bell Atlantic Network Services, Inc., Arlington, Va.

[21] Appl. No.: 709,593

[22] Filed: Sep. 9, 1996

[51] Int. Cl.$^6$ .......................... H04M 15/00; H04M 3/12; H04M 7/00
[52] U.S. Cl. .......................... 379/127; 379/121; 379/114; 379/207; 379/221; 379/230
[58] Field of Search .......................... 379/112, 114, 379/115, 116, 117, 118, 119, 220, 121, 127, 201, 207, 219, 221, 230, 120

[56] References Cited

U.S. PATENT DOCUMENTS

| | | |
|---|---|---|
| 4,348,554 | 9/1982 | Asmuth . |
| 4,802,199 | 1/1989 | Lange et al. . |
| 4,982,421 | 1/1991 | Kirsch et al. . |
| 5,212,691 | 5/1993 | Hokari . |
| 5,247,571 | 9/1993 | Kay et al. . |
| 5,282,244 | 1/1994 | Fuller et al. . |
| 5,303,290 | 4/1994 | Redberg et al. . |
| 5,339,356 | 8/1994 | Ishii . |
| 5,377,186 | 12/1994 | Wegner et al. . |
| 5,386,467 | 1/1995 | Ahmad . |
| 5,418,844 | 5/1995 | Morrisey et al. . |
| 5,425,091 | 6/1995 | Josephs . |
| 5,436,957 | 7/1995 | McConnell . |
| 5,440,626 | 8/1995 | Boyle et al. .......... 379/230 |
| 5,452,350 | 9/1995 | Reynolds et al. . |
| 5,455,855 | 10/1995 | Hokari . |
| 5,459,779 | 10/1995 | Backaus et al. . |
| 5,465,295 | 11/1995 | Furman . |
| 5,479,494 | 12/1995 | Clitherow . |
| 5,479,495 | 12/1995 | Blumhardt . |
| 5,481,603 | 1/1996 | Gutierrez et al. . |
| 5,487,110 | 1/1996 | Bray et al. . |
| 5,553,130 | 9/1996 | Turner .......... 379/207 |
| 5,644,632 | 7/1997 | Ardon .......... 379/156 |

OTHER PUBLICATIONS

Declaration by William Kay, Mar. 1997.
Virtual Foreign Exchange, Network Technologies, Jul. 1995.
Declaration Judith Cameron, Mar. 1997.
Intersearch Research Corp, Research Report on Dial FX trial, Dec. 1995.

*Primary Examiner*—Curtis Kuntz
*Assistant Examiner*—Paul Loomis
*Attorney, Agent, or Firm*—McDermott, Will & Emery

[57] ABSTRACT

In a virtual implementation, intelligent processing permits use of selectively switched connections and selective billing procedures to emulate a foreign exchange service. On outgoing foreign exchange calls, a local switching system detects a predetermined event, such as dialing of an access code, as a trigger. In response to this trigger, the local switching system queries a central database, and the central database instructs that switching system to route the call through a foreign exchange central office switching system using the customer's own foreign exchange number. The foreign exchange office queries the database in response to all calls using the foreign exchange number, i.e. both for incoming and outgoing calls. For an outgoing call, the database instructs the foreign exchange central office switching system to route the call to the dialed number destination and to record the foreign exchange number as the point of call origin for billing purposes. For incoming calls, the database instructs the foreign exchange to route calls to the customer's communication link, i.e. through the local exchange central office switching system. For both incoming and outgoing calls, the central database instructs at least one of the switching systems not to record billing or charge data for the portion of the communication link running between the switching systems.

23 Claims, 3 Drawing Sheets

Figure 3 ately process or switch communications on the foreign exchange line. For normal local service, a foreign exchange customer typically has a second telephone line connected to the local central office switch.

VIRTUAL FOREIGN EXCHANGE SERVICE

TECHNICAL FIELD

The present invention relates to an intelligent telecommunications network and methods of operation thereof to provide a foreign exchange service.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
Answer Message (ANM)
Automatic Message Accounting (AMA)
Call Processing Record (CPR)
Central Office (CO)
Common Channel Interoffice Signalling (CCIS)
Destination Point Code (DPC)
Dialed Number (DN) trigger
Foreign eXchange (FX)
Initial Address Message (IAM)
Integrated Service Control Point (ISCP)
Integrated Services Digital Network (ISDN)
ISDN User Part (ISDN-UP)
Message Transfer Part (MTP)
Multi-Services Application Platform (MSAP)
Office Dialing Plan (ODP)
Origination Point Code (OPC)
Plain Old Telephone Service (POTS)
Point in Call (PIC)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Terminating Attempt Trigger (TAT)
Transaction Capabilities Applications Protocol (TCAP)
Virtual Foreign eXchange (VFX)

BACKGROUND ART

Foreign eXchange (FX) service provides a customer with telephone service from a distant exchange that is outside (foreign to) the exchange area in which the customer resides.

Using existing technology, the telephone carrier establishes a telephone line circuit running from the foreign exchange to the customer's premises. For convenience of installation, this circuit typically runs from the foreign exchange to the central office facility that normally would serve the customer's location. However, the foreign exchange line is cross-connected to form a hard-wired line through that office to the twisted wire pair line going to the customer's premises. The local central office does not actu- In operation, the customer picks up the handset connected to the foreign exchange line and receives dial-tone from the distant foreign exchange. The customer dials destination digits, the foreign exchange receives the digits and routes the call, and the foreign exchange bills for the call based on rate calculations for calls originating from that exchange. The customer is separately billed a flat monthly fee for the line connection from the foreign exchange to the customer's premises, typically based on the length of the foreign exchange line.

A party calling the customer dials a number assigned to the customer for the foreign exchange line. The number is one normally associated with the distant exchange. Calls come through the network to that exchange in the normal manner, and the exchange connects the calls to the foreign exchange line. To the callers, the dialed number and the attendant billing appear as if the customer resided in the service area of the distant exchange.

For example, a business customer located in an outer suburb of a major city might subscribe to a foreign exchange service through a distant exchange inside the city. To people in the city calling the business using the foreign exchange service number, the call is a local call. Also, calls the business places to its customers in the city would appear as and be billed as local calls within the city service area.

There are several problems with the current implementations of foreign exchange service. Most significantly, the service requires a dedicated line circuit running from the distant exchange, through the wiring facilities of the local exchange to the customer's premises. As noted, in most cases a second line also runs from the local exchange to the customer's premises for normal local telephone service. This extensive wiring is quite expensive to install and maintain resulting in high installation costs.

In practice, the circuit from the foreign exchange to the local central office facility normally uses twisted wire pairs from trunk cable groups. As a result, the twisted wire pair between the foreign exchange and the local central office facility is unavailable for normal trunk usage. The circuit is used only when a call is coming from or going to the foreign exchange customer, otherwise the circuit is idle. The dedication of a wire circuit between offices or exchanges is an inefficient use of trunk circuit resources.

To the customer, the telephone company often must charge a relatively high installation cost as well as a high monthly fee for the foreign exchange line. In most cases, the customer incurs the monthly charge for the foreign exchange service in addition to the monthly charge for the local line service.

In recent years, a number of new service features have been provided by an enhanced telephone network, sometimes referred to as an Advanced Intelligent Network (AIN). AIN type call processing relies heavily on signaling communication via the Common Channel Interoffice Signalling (CCIS) network and call processing information stored in a central database. In an AIN type system, local and/or toll offices of the public telephone network detect one of a number of call processing events or points in calls (PICs) identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a CCIS link to the the central database, for example, an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing private network like features as part of an Area Wide Centrex service, for example, was disclosed and described in detail in commonly assigned U.S. Pat. No. 5,247,571 to Kay et al., the disclosure of which is entirely incorporated herein by reference. AIN type processing in such a system is controlled by the ISCP, which typically is operated by the local exchange carrier.

There have been a number of other proposals to use AIN type call processing to provide private network and/or private line services. For example, U.S. Pat. No. 4,348,554 to Asmuth discloses a method for providing virtual private network services via the public switched telephone network using AIN-like processing. Information stored at a central network database defines a customer's virtual private network. The information includes a description of the capacity of the virtual network in terms of virtual telephone facility resources of a prescribed type. In response to a call received at a telephone central office, directed to the virtual network, a verification is made at the database that the call is entitled to be completed via the virtual network and that an idle virtual resource remains for assignment to the call. The idle virtual resource is assigned to the call, and the call is completed via the public switched telephone network using the assigned virtual resource.

As another example, U.S. Pat. No. 4,982,421 to Kirsch et al. discloses an AIN processing technique providing an immediate point-to-point line service. Although the service emulates a private line, the service actually uses a switched communication circuit. The network, however, sets up this switched circuit only when one of the terminals of the private line goes off-hook. In order to protect the service, the service assigns both terminals to a common software defined network using a non-dialable routing number derived from the identity of the calling station upon off-hook condition. Whenever either terminal lifts its receiver, the associated switching office queries a central database, and that database returns the routing number. The switching office sets up a connection through network, as controlled by the routing number.

As shown by the above examples, although AIN processing has been used to provide private facility type services, none of the prior art proposals relating to AIN have addressed the problems of foreign exchange service.

DISCLOSURE OF THE INVENTION

An objective of the present invention is to overcome the above noted problems of foreign exchange type services.

Another objective of the present invention is to provide a service to a telecommunications customer that exhibits the service features of a foreign exchange service but does not require dedicated wiring from the distant exchange to the customer's premises. Because there is no dedicated connection to the foreign exchange, the service becomes a 'virtual' foreign exchange (VFX) service.

A more specific objective is to provide the virtual foreign exchange service through the distant switching office, without dedicated wiring, and still maintain all present features of foreign exchange type billing. Specifically, outgoing calls are billed as if originated from a telephone line connected to the foreign exchange, and incoming calls are billed to the callers as if directed to a line connected to the foreign exchange.

Another objective is to offer the customer both a foreign exchange service and normal local line service over a single subscriber loop circuit to the customer's premises.

The present invention achieves the stated objectives and addresses the above noted problems by developing a network and associated call processing routines for incoming and outgoing calls to provide selectively switched communication links emulating the foreign exchange service.

Thus, in one aspect, the present invention contemplates a method of processing incoming and outgoing calls relating to the foreign exchange service, using a common foreign exchange number. The customer is assigned a foreign exchange number that normally is associated with a distant or foreign exchange. One exchange provides local communication service to the foreign exchange service customer. That exchange detects outgoing foreign exchange service calls, for example by detecting input of a predetermined access code followed by dialed destination digits. A first selectively switched communication link is established for an outgoing call. This first link runs through the local exchange and through a foreign exchange to the customer selected destination. The exchanges establish this link at least in part by processing the call based on the foreign exchange number. When communication via the first link is complete, the exchanges tear down that link.

The method also includes foreign exchange processing of incoming calls, i.e. calls directed to the same foreign exchange number. On incoming calls, a second selectively switched communication link is established for the incoming call. This selectively switched link runs from the foreign exchange through the local exchange to a communication link serving the foreign exchange service customer.

In another aspect, the present invention also entails billing for the selectively switched links in a manner that emulates foreign exchange billing. More specifically, the exchanges recording no billing charges for any portion of the selectively switched communication links that run between the local exchange and the foreign exchange. For outgoing calls, the foreign exchange records billing information for any portion of the first selectively switched communication that runs from the foreign exchange to the customer selected destination, using the foreign exchange number as an identification of point of call origin. For incoming calls, billing related information is recorded only for any portion of the second selectively switched communication link that runs to the foreign exchange.

In one commercial service offering, the virtual foreign exchange service provides a customer a telephone number normally associated with the distant 'foreign' central office. Foreign exchange calls from the customer's line and calls to the foreign exchange number all go through the foreign exchange. Foreign exchange calls from the customer's line are billed as if they originated from a local line connected to the foreign exchange. Calls to the foreign exchange number are billed as if the calls terminated on a local line connected to the foreign exchange. The network carrier charges the customer a flat monthly fee which, on average, covers the costs of the switched connections between the foreign exchange and the local exchange providing the actual connection to the customer's line.

The disclosed preferred embodiment of the present invention utilizes an advanced intelligent network. to provide the inventive virtual foreign exchange service. Thus, another aspect relates to an inventive network architecture. In this regard, the network includes local exchange and foreign exchange central office switching systems. The local exchange switching system has a predetermined trigger set with respect to outgoing calls from the foreign exchange customer's communication link. The foreign exchange central office switching system has a trigger set with respect to calls directed to the customer's foreign exchange number. At least one interoffice trunk carries communication traffic between the local exchange central office switching system and the foreign exchange central office switching system. The network further comprises a central database and an interoffice signal network. The central database is remote from the central office switching systems. The interoffice signaling system carries signaling messages between the local exchange central office switching system and the foreign exchange central office switching system. The interoffice signaling system also carries signaling messages between the central office switching systems and the central database.

The central database stores call processing information for a plurality of customers including the foreign exchange customer. The call processing information for the foreign exchange customer includes information to instruct the local exchange central office switching system to route an outgoing call from a foreign exchange customer's communication link to the foreign exchange central office switching, using the foreign exchange number, in response to detection of the predetermined trigger. The call processing information for the foreign exchange customer also includes information to instruct the foreign exchange central office switching system to route an outgoing call from the customer's communication link to a customer selected destination and bill for the call using the foreign exchange number. Further, the call processing information for the foreign exchange customer includes information to instruct the foreign exchange central office switching system to route incoming calls directed to the foreign exchange number through the local exchange central office switching system to the customer's communication link.

In the preferred embodiment, the network is a public switched telephone network. As such, the customer's communication link is a telephone link, such as a standard POTS or ISDN telephone line. The central offices comprise telephone switches. The interoffice signaling network is a telephone network type common channel interoffice signaling network, such as an SS7 compliant network. The preferred implementation of the central database is as a database running in an Integrated Service Control Point (ISCP). Operation of the preferred embodiment is summarized below.

For an incoming call, the calling party dials the foreign exchange number, and the public switched telephone network routes the call to the foreign exchange in the normal manner. At the foreign exchange, the call activates a terminating attempt trigger (TAT) or dialed number (DN) trigger set against the foreign exchange number. In response to the trigger, the foreign exchange office suspends call processing and queries the ISCP. The ISCP instructs the foreign exchange to route the call to the customer's line, using the customer's normal local telephone number. The foreign exchange resumes its call processing and completes the call through the customer's local serving end office exchange. The instruction from the ISCP also causes the foreign exchange not to record any charge data for the leg of the call from the foreign exchange to the customer's line.

Calls directed to the normal telephone number assigned to the customer's line will not hit a trigger related to the foreign exchange service. The network therefore routes and bills for those incoming calls to the line, in the normal manner. The customer can also make normal outgoing calls over the line. For outgoing foreign exchange service, an access code trigger type trigger is set in the local exchange serving the customer's telephone line. If the customer makes an outgoing call without dialing the access code, the local exchange processes the call in the normal manner, and the network accumulates billing related information in the normal manner.

To make an outgoing foreign exchange service call, the customer initially dials the access code, e.g. *95. In response, the local exchange provides second dial-tone and collects additional digits representing the destination number. The access code triggering initiates AIN processing. The local exchange therefore transmits a query, containing the access code, the dialed digits and the calling party line number (identifying the foreign exchange customer's telephone line), to the ISCP. The ISCP instructs the local exchange to route the call to the customer's own foreign exchange telephone number. The instruction from the ISCP includes the actual destination digits in a 'charge number' field and instructs the local exchange not to record billing or charge data for the call.

When the local exchange routes the call using the foreign exchange number, the call activates the same terminating attempt trigger (TAT) or dialed number (DN) trigger set against the foreign exchange number in the foreign exchange office. In response to the trigger, the foreign exchange office suspends call processing and queries the ISCP. This query identifies the calling party line (i.e. the foreign exchange customer's line). The query includes the foreign exchange number and includes the dialed destination digits in a charge number field.

At this point in outgoing call processing, the ISCP recognizes that the call originated from the foreign exchange customer's own line. Under these circumstances, the ISCP formulates a call routing instruction containing the destination number digits originally dialed in the routing number field and the foreign exchange number in the charge number field. This message also includes a code instructing the foreign exchange office to record the call for normal toll rating using the charge number as the origination number. The ISCP transmits this message back to the foreign exchange office, and that office routes and accumulates billing data for the call as instructed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
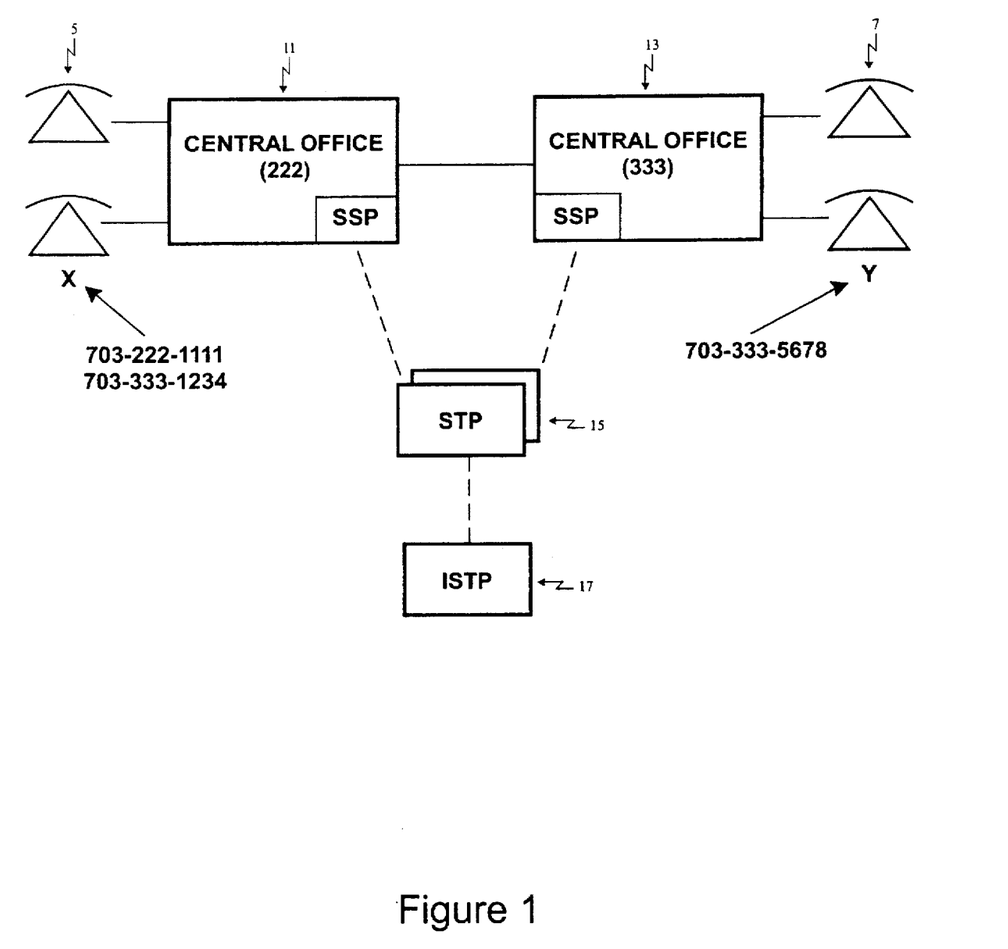
FIG. 1 is a simplified block diagram of an advanced intelligent network implementing the virtual foreign exchange service in accord with the present invention.

FIG. 1 provides a simplified block diagram of an AIN type public switched telephone network (PSTN). The telephone network includes a switched traffic network and a common channel signaling network carrying the control signaling messages for the switched telephone traffic network. The telephone or traffic network (operated by a combination of local carriers and interexchange carriers) includes a number of end office and tandem office type central office switching systems. FIG. 1 illustrates two end offices 11 and 13. End office 11 provides switched telephone connections to and from local communication lines coupled to end users telephone station sets 5. Similarly, end office 13 provides switched telephone connections to and from local communication lines coupled to end users telephone station sets 7.

The simplified diagram in FIG. 1 shows a trunk connection between the central offices 11 and 13 (shown as a solid line connection). The telephone network typically also includes one or more tandem switching offices (not shown) providing trunk connections between end offices. As such, the network consists of local communication links and a series of switching offices interconnected by voice grade trunks.

Although shown as telephones in FIG. 1, the terminal devices 5 and 7 can comprise any communication device compatible with the local communication line. Where the line is a standard voice grade telephone line, for example, the terminals could include facsimile devices, modems etc. Also, FIG. 1 shows connections to the station via lines, and typically these links are telephone lines (e.g. POTS or ISDN). It will be apparent to those skilled in the art, however, that these links may be other types of communication links, such as wireless links.

The lines and trunks through the central offices 11 and 13 carry the communication traffic of the telephone network. The telephone network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems such as offices 11 and 13 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the preferred embodiment shown in FIG. 1, each central office 11, 13 has at least minimal SS7 signaling capability, which is conventionally referred to as a signaling point (SP) in reference to the SS7 network. Preferably each switching office is programmed to recognize identified events or points in call (PICs) as AIN service triggers. In response to a PIC, a central office such as 11 or 13 initates a query through the CCIS signaling network to an Integrated Service Control Point (ISCP) 17 for instructions relating to AIN type services. Central office switching systems having full AIN trigger and query capability are referred to as Service Switching Points (SSPs).

The central office switches such as 11 and 13 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

The above described data signalling network between the SSP type central offices 11, 13 and the ISCP 17 is preferred, but other signalling networks could be used.

For example, instead of the packet switched type links through one or more STP's, a number of central office switches, an ISCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the ISCP via an SS7 type CCIS link, as in the implementation described above. The SSP capable tandem switches are digital switches, such as the 5ESS switch from AT&T; and the non-SSP type end offices might be 1A analog type switches.

The ISCP 17 is an integrated system. Among other system components, the ISCP 17 includes a Service Management System (SMS), a Data and Reporting System (DRS) and the actual database referred to as a Service Control Point (SCP). The ISCP also typically includes a terminal subsystem referred to as a Service Creation Environment or SCE for programming the MSAP database in the SCP for the services subscribed to by each individual customer.

The components of the ISCP 17 are connected by an internal, high-speed data network, such as a token ring network. The internal data network also typically connects to a number of interfaces for communication with external data systems, e.g. for provisioning and maintenance.

The telephone network may also include one or more intelligent peripherals (not shown) to provide enhanced announcement and digit collection capabilities and/or speech recognition. Commonly assigned copending U.S. patent application Ser. No. 08/248,980, filed May 24, 1994, entitled "Advanced Intelligent Network with Intelligent Peripherals Interfaced to the Integrated Services Control Point" (attorney docket no. 680-076) provides a more detailed disclosure of an AIN type telephone network, including the structure of SSP switches, the structure of an ISCP, the structure of an intelligent peripheral and the structure of the second signaling network; and the disclosure of those structures and the operation thereof from that application is incorporated herein in its entirety by reference.

Typically, each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

For the foreign exchange service, the telephone company assigns the foreign exchange customer a telephone number normally associated with the distant exchange.

In specific examples discussed in more detail later, the foreign exchange service customer has one or more of the stations sets X from among the stations 5 which connect to the central office 11. The central office 11 has a three digit exchange code 222 assigned thereto and is located within the area serviced by area code 703. The central office 13 serves as the 'foreign' exchange with respect to the customer at station X. The central office 13 has a three digit exchange code 333 assigned thereto and is located within the area serviced by area code 703. The foreign exchange customer using station X has a local telephone number 703-222-1111 as well as a foreign exchange number 703-333-1234. Several specific call examples involve calls between the foreign exchange customer's station X and another party using station Y connected to the foreign exchange 13. For purposes of those examples, it is assumed that station Y is assigned a telephone number of 703-333-5678.

As noted, AIN call processing involves a query and response procedure between an SSP capable switching office and a database system, such as an ISCP. The SSP capable switching offices initiate such processing upon detection of triggering events. At some point during processing of a telephone call, a central office switching system will recognize an event in call processing as a 'Point in Call' (PIC) which triggers a query to the ISCP. Ultimately, the ISCP will return an instruction to the switching system to continue call processing. This type of AIN call processing can utilize a variety of different types of triggers to cause the SSPs to initiate the query and response signaling procedures with the ISCP. In the presently preferred embodiment, the virtual foreign exchange service utilizes two different types of triggers.

The first trigger is an Access Code Trigger, such as an Office Dialing Plan (ODP) type Access Code Trigger. This is a subscribed type of trigger set against the record or profile of each customer subscribing to a service utilizing this trigger. Specifically, this trigger is set in the subscriber's profile record in the SSP capable central office processing outgoing calls from the customer or subscriber. Detection of dialed digits corresponding to the ODP Access Code causes the switch to provide second dial-tone and collect additional digits. The end office detecting the code launches a query to the ISCP after collection of the additional digits, and the query includes the dialed access as well as the subsequently dialed digits. For the virtual foreign exchange service, this type of trigger is set in the local central office exchange providing the local loop connection to the customer's premises, e.g. end office switching system 11 in the example shown in FIG. 1. As discussed more fully below, a customer uses this ODP Access Code trigger to selectively obtain the virtual foreign exchange processing on outgoing calls.

For outgoing calls from the foreign exchange customer's station X, serving central office switch 11 initiates AIN type query and response processing if and only if the first series of digits dialed on an outgoing call correspond to a predefined Access Code, for example '*95'. Thus, if a person initiates a call from the customer's telephone X in the normal manner, without first dialing the Access Code, then the central office switching system 11 processes and accumulates billing data for the call in the normal manner. However, if the caller initially dials the code, *95 in the current example, when the connected end office switch reaches the point in call (PIC) at which it detects the trigger then the end office switch begins processing the call as an AIN call.

The present invention also utilizes a dialed number trigger (DN) or terminating attempt trigger (TAT). In general, this type of trigger is set in the customer profile record associated with a destination telephone number in the exchange or switching office serving that telephone number. When the exchange detects a call to the telephone number, that exchange suspends its call processing and launches a query to the ISCP. For the virtual foreign exchange service, this trigger is set against the telephone number assigned to the customer for the foreign exchange service in the distant or foreign exchange (central office 11 in the example shown in FIG. 1).

Figure 2:
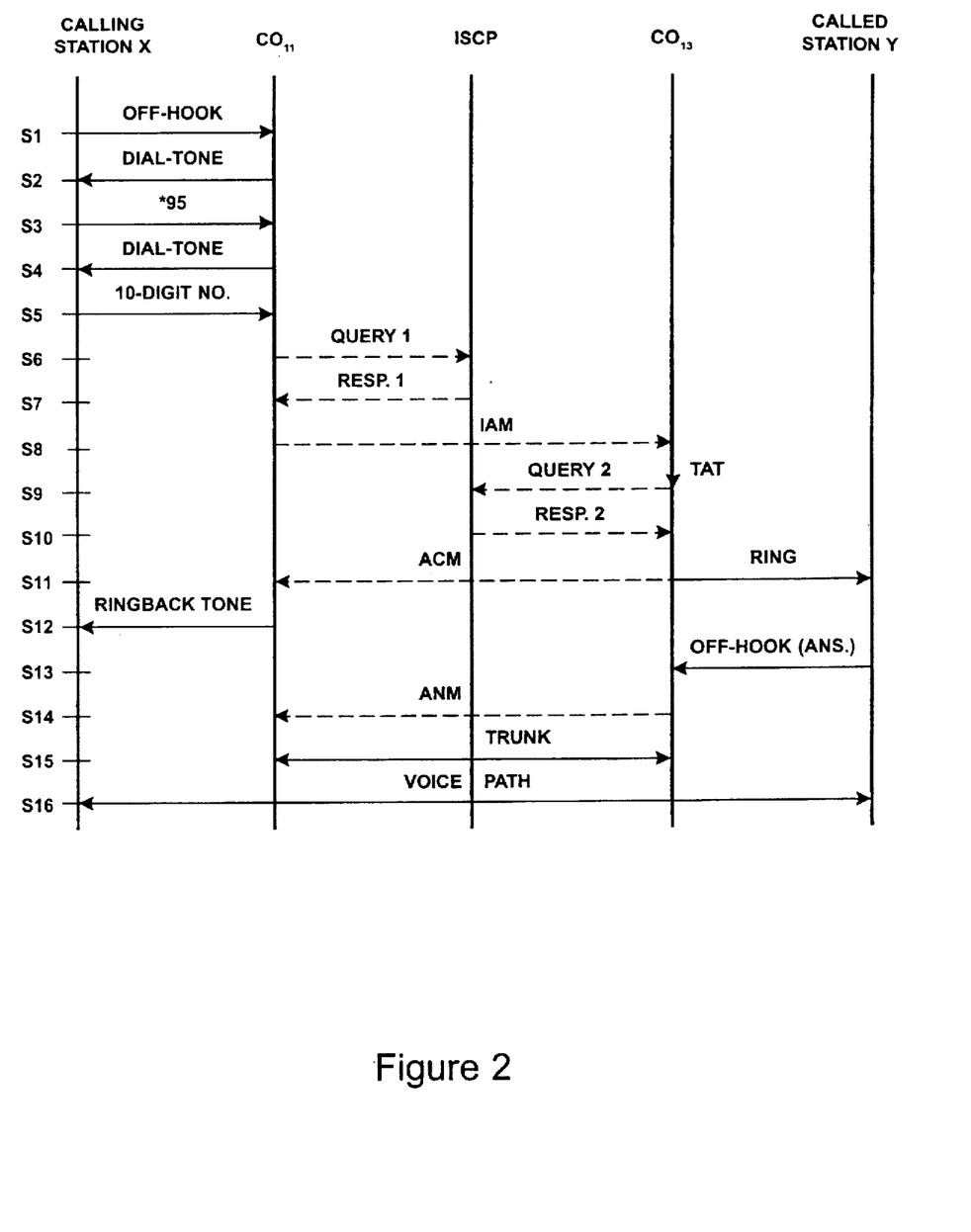
FIG. 2 is a message flow diagram useful in explaining processing of an outgoing call via the inventive virtual foreign exchange service.

FIG. 2 illustrates the signal flows for processing of an outgoing foreign exchange call in somewhat more detail. For purposes of discussion, it is assumed that the calling party line and the called party line both are POTS lines and both parties use standard telephones. In FIG. 2, a subscriber initiates an outgoing call from the station X by taking the telephone station equipment off-hook. This condition creates a change in line condition detectable by the connected central office (CO) switching system 11 (S1). In response, that office supplies dial-tone over the line (S2). For a foreign exchange call, the caller now dials *95 (S3).

When the central office 11 detects the off-hook condition for an outgoing call, the administrative module processor of that switching system identifies the off-hook line and loads the customer profile record associated with the line from mass storage into a call store register allocated for processing the call. In the present example, the profile corresponds to a foregin exchange customer and includes data to identify an Access Code trigger. Thus, for the virtual foreign exchange service, when the central office switch 11 detects the dialed *95 digits, the switch provides second dial-tone (S4) and waits to collect an additional ten digits. From the caller's point of view, the caller hears the second dial-tone and dials in the ten-digit destination telephone number for the party she is calling (S5). For purposes of this example, assume that the caller dials 703-333-5678.

After collecting the additional dialed digits, the central office switching system 11 launches a first TCAP query message through the STP(s) to the ISCP (S6). At the Message Transfer Part (MTP) layer, the query message bears an SS7 point code address assigned to the ISCP in a destination point code (DPC) field and a point code of the customer's local central office 11 in the origination point code (OPC) field. The STP, as a packet switch, executes its normal routing and translation functions to send the message over the data link to the ISCP 17.

At the application protocol layer, the first query message utilizes a standard TCAP format for an initial query type message to a database. Of particular note for purposes of the present discussion, this TCAP query message includes the *95 digits as an indication of the triggering event that caused the query, the dialed ten digits of the destination number (703-333-5678) and the calling party's telephone number (703-222-1111).

The ISCP 17 recognizes the call as an outgoing foreign exchange service type call from the presence of the *95 digits in the query message. In response to this type of triggering event, the ISCP 17 uses the calling party telephone number (703-222-1111) as a service key or access code. Specifically, the ISCP 17 identifies a call processing record (CPR) for the customer stored in its internal MSAP database, from the customer's number (703-222-1111) carried in the query message.

In response to the query, the ISCP 17 formulates a TCAP call control type response message containing instructions for routing the call. This first TCAP response message includes a routing number field and a charge number field. For purposes of responding to this first query on the outgoing call, the customer's CPR causes the ISCP 17 to populate the routing number field with the customer's own virtual foreign exchange number, 703-333-1234 in the illustrated example. The customer's CPR also causes the ISCP 17 to populate the charge number field in the response message with the ten-digit dialed number (e.g. 703-333-5678).

The ISCP 17 sends the TCAP response message back to the central office switching system 11 (S7). More specifically, the ISCP 17 encapsulates the TCAP message within the Message Transfer Part (MTP) elements of an SS7 packet. The MTP layer elements use the same point codes as used to address the original query message, except that the positions in the packet are reversed. The point code of the central office 11 is now the destination point code (DPC), and the point code of the ISCP 17 is now the origination point code (OPC). The STP, as a packet switch, executes its normal routing and translation functions to send the message over the data link to the central office 11.

In response to the message from the ISCP 17, the foreign exchange subscriber's local central office 11 initiates its normal procedures for routing the call, albeit using the routing number received from the ISCP 17. In this case, the central office 11 uses the virtual foreign exchange number already assigned to the customer (e.g. 703-333-1234) to initiate a CCIS communication with the exchange normally assigned for processing calls bearing the area code and exchange number digits for this routing number (e.g. 703-333). In the illustrated example, the central office 11 initiates CCIS communication with the foreign exchange central office (CO) 13.

The subscriber's local central office 11 generates an Initial Address Message (IAM) for transmission to the foreign exchange central office 13 (S8). The IAM message has the destination point code (DPC) of the distant or foreign 333 central office 13. The IAM message also includes an origination point code (OPC) of the customer's serving-end central office 11. The local central office 11 places the routing number (e.g. 703-333-1234) in the destination number field of the IAM message, places the caller's normal telephone number (703-222-1111) in the calling party number field and places the actual dialed digits from the charge number field of the response message in a charge number field of the IAM message. The local central office 11 transmits the IAM message over a data link to one of the STPs 15.

The STP looks at the message and determines that the message was not for it as an STP but rather is for the distant office CO 13. The STP therefore executes its normal translation and routing process to forward the message to the correct end office.

Although no equipment is connected to the foreign exchange central office 13 in association with the foreign exchange number, that exchange does store a customer profile record in association with that number. Of particular note, the customer profile record establishes a terminating attempt trigger (TAT) against the virtual foreign exchange number (e.g. 703-333-1234).

When the distant office 13 receives the IAM message, the administrative module processor for that office retrieves the customer profile for the number in the destination number field of that message (e.g. 703-333-1234) from its mass storage system and loads that profile into one of its call store registers. At this point, the foreign central office 13 recognizes the virtual foreign exchange number in the destination number field of the IAM message as a terminating attempt trigger (TAT) type point in call (PIC).

In response to the terminating trigger type point in call (PIC), the foreign exchange central office 13, acting as a second SSP, launches a second TCAP query message through the STP(s) 15 to the ISCP 17 (S9). At the Message Transfer Part (MTP) layer, the second query message bears an SS7 point code address assigned to the ISCP 17 in a destination point code (DPC) field and a point code of the terminating central office 13 in the origination point code (OPC) field. The STP, as a packet switch, executes its normal routing and translation functions to send the message over the data link to the ISCP 17.

At the application protocol layer, the second TCAP query message also utilizes a standard TCAP format for an initial query type message to a database. This TCAP query message includes an identification of the terminating attempt trigger. The dialed digits or destination number field of the second query contains the virtual foreign exchange number digits (e.g. 703-333-1234). The query includes a field for the calling party number (e.g. 703-222-1111). This query also includes information in a 'charge number' field. Specifically, the SSP type foreign exchange central office 13 populates the 'charge number' field of the second query with the number taken from the charge number from the IAM message. In this case, the charge number actually is the ten digit destination number originally dialed through the telephone at the customer's premises, 703-333-5678 in the present example.

In response to the terminating attempt trigger identification in the second query, the ISCP 17 utilizes the destination digits as the service key or access code to access its internal database. Thus, at this point the ISCP accesses the customer's CPR based on the foreign exchange number (e.g. 703-333-1234).

The CPR specifies two particular types of call processing for two types of calls that hit the terminating attempt trigger on the foreign exchange number. The first type of process relates to calls that originated from the caller's own line as identified by the number in the calling party field of the query message (e.g. 703-222-1111). Effectively, this indicates to the ISCP 17 that this query is in fact the second query relating to an outgoing call, as opposed to a query relating to an incoming call to the foreign exchange number (the second type call to hit the trigger, as discussed more later).

For this point in processing of the outgoing call, the customer's CPR instructs the ISCP 17 to reverse the destination number and charge number fields from the second query, to produce charge number and destination information for the call control type response message. More specifically, the ISCP 17 formulates a TCAP application layer type response message containing the originally dialed destination digits, taken from the charge number field of the second query (e.g. 703-333-5678), into the routing number field. The ISCP 17 also inserts the foreign exchange number, e.g. 703-333-1234 (taken from the destination number field of the second query) into a charge number field of the second TCAP response message.

The ISCP 17 sends the second TCAP response message back to the foreign exchange central office switching system 13 (S10). The ISCP 17 encapsulates the second TCAP response message within the Message Transfer Part (MTP) elements of an SS7 packet. The MTP layer elements use the same point codes as used to address the second query message, except that the positions in the packet are reversed.

The point code of the foreign exchange central office 13 is now the destination point code (DPC), and the point code of the ISCP 17 is now the origination point code (OPC). One of the STPs 15, acting as a packet switch, executes its normal routing and translation functions to send the message over the data link to the foreign exchange central office 13.

In response to the response message from the ISCP 17, the central office 13 resumes its normal processes for completing the call. For purposes of the present simplified example, it was assumed that the called party's line connects directly to the central office 13. The central office 13 suspended its processing of the call after receipt of the IAM message from the central office 11, therefore the central office 13 resumes with processing which would otherwise follow processing of the IAM message, but now based at least in part on the information received from the ISCP 17. In this case, the central office switching system 13 transmits an Address Complete Message (ACM) back to the central office 11 and if the called line is available applies ringing signal to the called party's line (S11).

The ACM includes a variety of information, including a calling party status indicator, e.g. line free or busy. If the line is not busy, the end office 13 rings the station Y corresponding to the dialed digits 703-333-5678, and generates the appropriate indicator in the Address Complete Message (ACM) to indicate that it received the request for a call and that the number is not busy. The ACM message is sent back by simply reversing the point codes from the IAM message. Now the destination point code (DPC) is the point code of the central office 11, and the origination point code (OPC) is the point code of the central office 13.

The ACM message goes back to the central office 11 through the one or more of the STPs 15, to indicate that the IAM message was received and processed. In response to the ACM message, if the called line is available, the originating central office 11 applies a ringback tone signal to the line to the calling station X (S12).

As soon as someone answers the telephone station Y, the distant central office switching system 13 detects an off-hook condition (S13). At this point, the distant central office 13 sends an Answer Message (ANM) back to the originating central office 11 through one or more of the STPs 15 (S14). The ANM message indicates that the phone Y was picked up. Also, at that time the actual telephone traffic trunk circuit is connected together between the central offices 11 and 13 (S15). The central office 11 connects the line to station X to the trunk circuit, and the central office 13 connects the line to station Y to the trunk circuit, to complete the voice path (S16). At this point, actual voice communication is established between the calling station X and the called station Y.

Communication continues until one or both parties hang up, at which time, all of the switched connections are torn down. As shown by the above discussion, switched links are set up only for the duration of the call. There is no need for dedicated or hard-wired links.

The TCAP response that the ISCP 17 sends back to the foreign exchange central office 13 (at S10) includes a predetermined Slip-ID code. This code instructs that office to record the call for normal toll rating using the charge number as the origination number. It will be apparent from the above discussion that the final 'charge number' received by the central office 11 was the foreign exchange number, (e.g. 703-333-1234). That exchange therefore creates an Automatic Message Accounting (AMA) record for the call using the foreign exchange number (e.g. 703-333-1234) as the point of origin and the dialed digits (e.g. 703-333-5678) as the destination number. In the present example, both of these numbers are associated with the one exchange, therefore the AMA record will reflect a local call within the service area of the second end office switching system. Subsequent processing of the AMA records from the central office switch 11 will result in billing the call only as a local call.

The first TCAP response that the ISCP 17 sends back to the local central office 11 (at step 57) includes a different predetermined Slip-ID code. This code instructs that office not to make a record of the call for billing purposes. Thus, the AMA record created by the central office switch 11 indicates that there is to be no charge for the call. The foreign exchange customer is billed a flat monthly fee for the virtual foreign exchange service which, on average, covers the interexchange link and the AIN signaling functionality. However, the system does not generate a per-call bill on each outgoing call connection for the leg of the call between the subscriber's local exchange and the foreign exchange. Thus, to the customer and the network accounting office, the billing functionality for outgoing calls using the virtual service is identical to that of the old hard-wired foreign exchange service.

The above call processing also provides a desirable feature relating to caller ID. If the customer makes a normal outgoing call without dialing the access code, the call is routed normally, and the called party receives normal caller ID information (e.g. 703-222-1111). However, the ISCP placed the foreign exchange number (e.g. 703-333-1234) in the origination number or charge number field of the response sent to the second office 13. Consequently, that office will provide the foreign exchange number as the caller ID information, directly to the called party's line or through any other exchange that processes the call before completion. Thus, on an outgoing foreign exchange number call, the caller receives the foreign exchange number as the caller ID information.

The customer can receive normal telephone calls at station X through the local exchange 11. Typically, no triggers are set with respect to the customer's normal telephone number (e.g. 703-222-1111), and the network routes calls for that number through the local exchange 11 in the normal manner with normal telephone call billing. Consider next processing of incoming calls intended for the foreign exchange telephone number.

Figure 3:
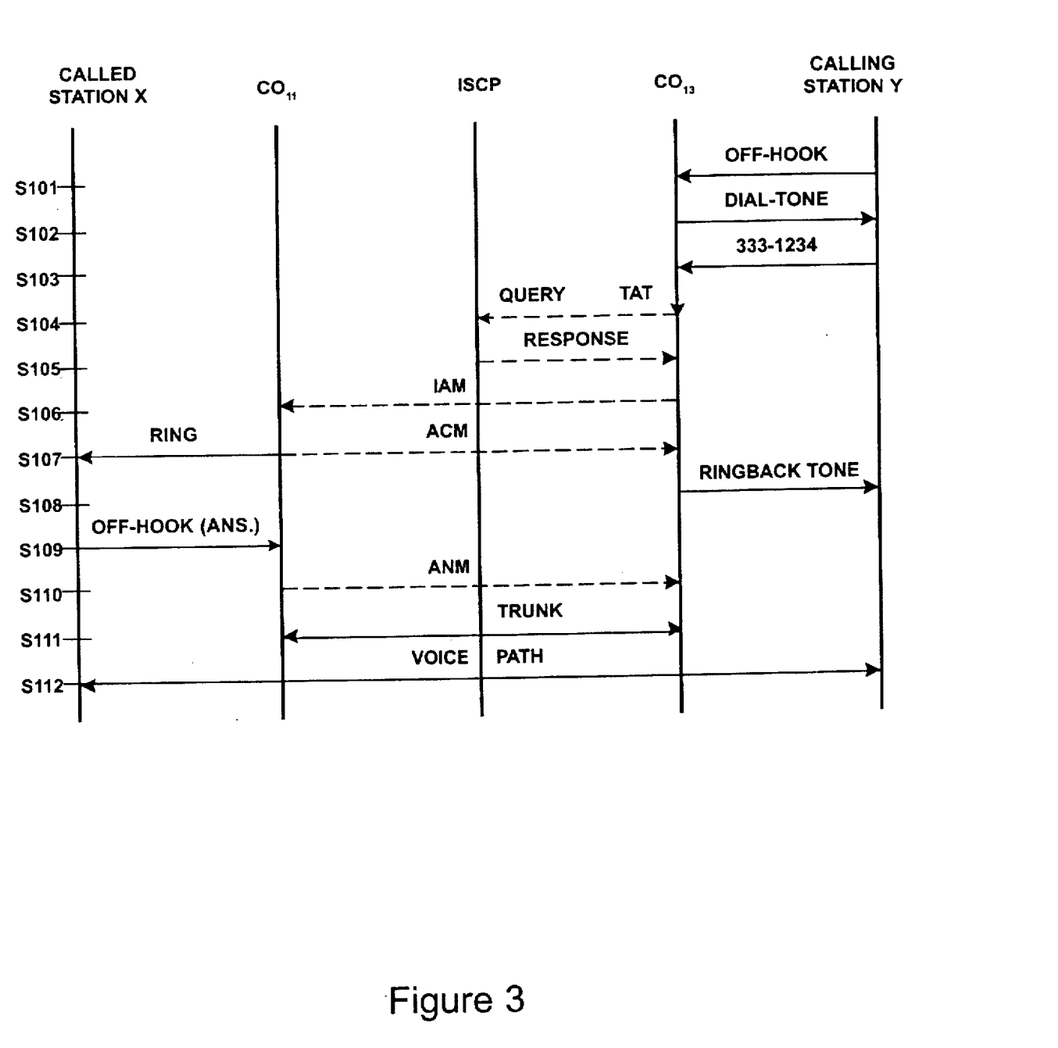
FIG. 3 is a message flow diagram useful in explaining processing of an incoming call via the inventive virtual foreign exchange service.

As noted in the above discussion, the customer profile record for the foreign exchange number, defined in the memory of the foreign exchange central office 13, defines a terminating attempt trigger (TAT) with respect to that number. The central office switching system 13 detects a terminating attempt trigger whenever it accesses the customer profile associated with the foreign exchange number and attempts to complete a call using that telephone number as the destination number. If the call is an inter-office call, processing reaches the point in call (PIC) and activates the terminating attempt trigger when the central office switching system 13 receives an IAM signaling message relating to a call to that number, in a manner similar to that in the outgoing call example. If the call is an intra-office call, call processing reaches the point in call (PIC) and activates the terminating attempt trigger when the central office switching system 13 accesses the profile record associated with the foreign exchange number in response to dialing of that number over a line connected to that switch 13. To provide a simplified example for discussion purposes, consider a local call from a station Y connected to the foreign exchange central office 13 to the foreign exchange number.

The user at station Y picks up his telephone handset to initiate an outgoing call. This off-hook condition creates a change in line condition detectable by the connected central office switching system 13 (S101). In response, that end office supplies dial-tone over the line to station Y (S102). Hearing dial-tone, assume that the caller at station Y dials the destination number, in the present example, the foreign exchange number 333-1234 (S103). An administrative module processor within the central office switch 13 loads subscriber profile information for the calling party's telephone line (associated with number 703-333-5678) from disc storage into an available register in a call store.

The dialed foreign exchange number (333-1234) also resides in the end office switch 13, therefore the administrative module processor within the central office switch 13 also loads subscriber profile information associated with the foreign exchange number from disc storage into the call store. At this point in call, the end office switch 13 detects the terminating attempt trigger (TAT) relating to the foreign exchange number.

In response to the terminating attempt trigger type point in call (PIC), the central office 13 launches a TCAP query message through the STP(s) 15 to the ISCP 17 (S104). At the Message Transfer Part (MTP) layer, this query message bears an SS7 point code address assigned to the ISCP 17 in a destination point code (DPC) field and a point code of the central office 13 in the origination point code (OPC) field. The STP, as a packet switch, executes its normal routing and translation functions to send the message over the data link to the ISCP 17.

At the application protocol layer, this TCAP query message utilizes a standard TCAP format for an initial query type message to a database and is generally similar in nature and content to that transmitted in step S9 in the earlier example. This TCAP query message includes an identification of the terminating attempt trigger. The dialed digits or destination number field of the query contains the virtual foreign exchange number digits (e.g. 703-333-1234). The query includes a field for the calling party number, but in the present example this is an actual third party caller's number, such as the 703-333-5678 number of calling station Y. There is no special manipulation of the charge number field.

In response to the terminating attempt trigger identification in this query, the ISCP 17 utilizes the destination digits as the service key or access code to access its internal MSAP database. Thus, at this point the ISCP 17 accesses the customer's CPR based on the foreign exchange number (e.g. 703-333-1234).

As noted above, the CPR specifies two particular types of call processing for two types of calls that hit the terminating attempt trigger on the foreign exchange number. The first type of process discussed above, related to calls that originated from the caller's own line. The second type of process relates to the incoming call. For such calls, the CPR specifies a particular type of call processing based on the recognition that the number in the calling party field of the query message (e.g. 703-333-5678) does not correspond to the caller's own line number (e.g. 703-222-1111). Effectively, this indicates to the ISCP 17 that this query is in fact a query relating to an incoming call from another party's station. For this point in processing of the incoming call, the customer's CPR instructs the ISCP 17 to return a routing instruction, wherein the destination routing number is the actual telephone number assigned to the telephone line connected to the foreign exchange customer's station X (703-222-1111 in the present example)

The ISCP 17 sends the TCAP response message back to the foreign exchange central office switching system 13 (S105) The ISCP 17 encapsulates the TCAP response message within the Message Transfer Part (MTP) elements of an SS7 packet. The MTP layer elements use the same point codes as used to address the second query message, except that the positions in the packet are reversed. The point code of the foreign exchange central office 13 is now the destination point code (DPC), and the point code of the ISCP 17 is now the origination point code (OPC). One of the STPs 15, acting as a packet switch, executes its normal routing and translation functions to send the message over the data link to the foreign exchange central office 13.

In response to the message from the ISCP 17, the central office 13 resumes its normal processes for completing the call. For purposes of the present simplified example, it was assumed that the calling party's line connects directly to the central office 13 whereas the destination line is connected to the central office 11. The central office 13 suspended its processing of the call after receipt of the dialed foreign exchange number but before effecting any voice circuit connection or sending out any CCIS messages. The central office 13 therefore resumes its processing by attempting to route the call using the routing number received from the ISCP 17, that is 703-222-1111 in the present example. In this case, the central office 13 uses the customer's real telephone number (703-222-1111) to initiate a CCIS communication with the exchange assigned for processing calls bearing the area code and exchange number digits for this routing number (e.g. the 703-222). In the illustrated example, the central office 13 initiates CCIS communication with the foreign exchange customer's local central office 11.

The central office 13 generates an Initial Address Message (IAM) for transmission to the central office 11 (S106). The IAM message has the destination point code (DPC) corresponding to the 222 central office 11. The IAM message also includes an origination point code (OPC) corresponding to foreign exchange central office 13. The central office 13 places the routing number (e.g. 703-222-1111) in the destination number field of the IAM message and places the caller's normal telephone number (703-333-5678) in the calling party number field. The central office 13 transmits the IAM message through data links and one of the STPs 15 to the central office 11 (S106).

The foreign exchange service of the present invention does not entail any other triggering during processing of incoming calls. Additional triggers would be set, possibly against the record for the customer's normal telephone number (e.g. 703-222-1111) if the customer subscribes to some other AIN service, but for this example, we have assumed no such subscription and thus no further triggers. When the local central office 11 receives the IAM message, the administrative module processor for that office retrieves the customer profile for the number in the destination number field of that message (e.g. 703-222-1111) from its mass storage system and loads that profile into one of its call store registers. Since there is no trigger set for processing of an incoming call to that number, the central office 11 executes its normal procedures for completing an incoming call.

The central office 11 checks the status of the telephone line associated with the destination number (703-222-1111) and formulates an appropriate Address Complete Message (ACM). If that line is available, the central office 11 generates the appropriate indicator in the ACM message to indicate that it received the request for a call and that the number is not busy and applies ringing signal to the line to station X (S107).

The central office sends the ACM message back by simply reversing the point codes from the IAM message and forwarding the message over the data link to an STP 15. Now the destination point code (DPC) is the point code of the central office 13, and the origination point code (OPC) is the point code of the central office 11. The ACM message goes back to the central office 13 through the one or more of the STPs 15, to indicate that the IAM message was received and processed. In response to the ACM message, the originating central office 13 applies a ringback tone signal to the line to the calling station Y (S108).

As soon as someone answers the telephone station X, the central office switching system 11 detects an off-hook condition (S109). At this point, the central office 11 sends an Answer Message (ANM) back to the central office 13 through one or more of the STPs 15 (S110). The ANM message indicates that the telephone X was picked up. Also, at that time the actual telephone traffic trunk circuit is connected together between the central offices 11 and 13 (S111). The central office 13 connects the line to station Y to the trunk circuit, and the central office 11 connects the line to station X to the trunk circuit, to complete the voice path (S112). At this point, actual voice communication is established between the calling station Y and the called station X. The communication link remains up until one or both parties hangs up, at which time, the network tears down the switched links making the various resources available for other traffic.

On the incoming call, the TCAP response that the ISCP 17 sends back to the foreign exchange central office 13 (at step S105) includes a predetermined Slip-ID code instructing that office not to make a record of the call for billing purposes. Thus, the AMA record created by central office switch 13 indicates that there is to be no charge for the interexchange leg of the call. The calling customer is billed for the incoming leg of the call in the normal manner. In the example, the caller at station Y made only a local call. If the call came in via another exchange (not shown) the caller would be billed for the interexchange leg from their home exchange to the foreign exchange 13, but not the leg to the exchange 11. As noted above, the foreign exchange customer is billed a flat monthly fee for the virtual foreign exchange service which, on average, covers the interexchange link and the AIN signaling functionality. However, the system does not generate a per-call bill for each incoming call connection between the foreign exchange and the subscriber's local exchange. Thus, to the customer and the network accounting office, the billing functionality for incoming calls using the virtual service is identical to that of the old hard-wired foreign exchange service.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A method of providing a virtual foreign exchange service to a customer connected to a local exchange, wherein the customer has been assigned a number associated with a foreign exchange, the method comprising the steps of:

on an outgoing call from a communication link of the customer to a dialed destination number, detecting a first trigger event at the local exchange;

in response to the first trigger event, querying a remote database via an interoffice signaling network to obtain a first call processing instruction, wherein the first call processing instruction includes the foreign exchange number;

processing the call from the local exchange to the foreign exchange using the foreign exchange number;

detecting the processing of the call using the foreign exchange number at the foreign exchange as a second trigger event;

in response to the second trigger event, querying the remote database via the interoffice signaling network to obtain a second call processing instruction, wherein the second call processing instruction includes the dialed destination number; and completing the call using the dialed destination number.

2. A method as in claim 1, wherein:

the local exchange and the foreign exchange comprise telephone central offices;

the communication link comprises a telephone line coupled to the local exchange; and the interoffice signaling network comprises a common channel interoffice signaling network.

3. A method as in claim 1, wherein the foreign exchange number and the dialed destination number comprise telephone numbers.

4. A method as in claim 1, wherein:

the first call processing instruction further includes a first code instructing the local exchange not to record billing information with regard to the outgoing call; and the second call processing instruction further includes a second code instructing the foreign exchange to utilize the foreign exchange number as point of origin for recording billing information for the outgoing call.

5. A method as in claim 1, wherein the step of querying the remote database to obtain a first call processing instruction comprises:

transmitting a first query from the local exchange to the remote database via the interoffice signaling network, said first query containing the dialed destination number and a local number assigned to the communication link of the customer; and transmitting a first response from the remote database to the local exchange via the interoffice signaling network, said first response containing the foreign exchange number in a routing number field and the dialed destination number in a charge number field.

6. A method as in claim 5, wherein the step of querying the remote database to obtain a second call processing instruction comprises:

transmitting a second query from the foreign exchange to the remote database via the interoffice signaling network, said second query containing the dialed destination number in a charge number field and the foreign exchange number; and transmitting a second response from the remote database to the foreign exchange via the interoffice signaling network, said second response containing the dialed destination number in a routing number field.

7. A method as in claim 1, wherein:

the second call processing instruction further includes the foreign exchange number; and further processing of the outgoing call by the foreign exchange facilitates providing caller identification information to a called destination based on the foreign exchange number.

8. A method as in claim 1, wherein the first trigger event comprises receipt of a predetermined access code.

9. A network comprising:

a local exchange central office switching system having a predetermined trigger set with respect to outgoing calls from a foreign exchange customer's communication link;

a foreign exchange central office switching system having a trigger set with respect to calls directed to a foreign exchange number associated with the foreign exchange central office switching system that has been assigned to the foreign exchange customer;

at least one interoffice trunk carrying selectively switched communication traffic between the local exchange central office switching system and the foreign exchange central office switching system;

a central database remote from the local exchange central office switching system and the foreign exchange central office switching system, wherein the central database stores call processing information for a plurality of customers including the foreign exchange customer, the call processing information for the foreign exchange customer comprising:

(a) information to instruct the local exchange central office switching system to route an outgoing call from the foreign exchange customer's communication link to the foreign exchange central office switching system using the foreign exchange number, in response to detection of the predetermined trigger, (b) information to instruct the foreign exchange central office switching system to route outgoing calls from the customer's communication link to a customer selected destination and bill for the call using the foreign exchange number, and (c) information to instruct the foreign exchange central office switching system to route incoming calls directed to the foreign exchange number through the local exchange central office switching system to the customer's communication link; and a interoffice signaling system carrying signaling messages between the local exchange central office switching system and the foreign exchange central office switching system and between the central office switching systems and the central database.

10. A network as in claim 9, wherein the local exchange central office switching system and the foreign exchange central office switching system comprise telephone switches.

11. A network as in claim 10, wherein the foreign exchange customer's communication link comprises a telephone link.

12. A network as in claim 11, wherein the telephone link comprises a telephone line.

13. A network as in claim 10, wherein the interoffice signaling network comprises a common channel interoffice signaling network.

14. A network as in claim 13, wherein the common channel interoffice signaling network comprises signaling system 7 (SS7) compliant network.

15. A network as in claim 10, wherein the central database is an element of an Integrated Service Control Point.

16. A method comprising:

detecting an outgoing foreign exchange service call to a customer selected destination at a local exchange providing local communication service to a foreign exchange service customer;

establishing a first selectively switched communication link for the outgoing call through the local exchange and a foreign exchange to the customer selected destination, using a foreign exchange number associated with the foreign exchange and assigned to the foreign exchange service customer;

tearing down the first selectively switched communication link when communication ends;

detecting an incoming call directed to the foreign exchange number at the foreign exchange; and establishing a second selectively switched communication link for the incoming call from the foreign exchange through the local exchange to a communication link serving the foreign exchange service customer.

17. A method as in claim 16, further comprising:

recording no billing charge for any portion of the first selectively switched communication link that runs between the local exchange and the foreign exchange; and recording billing related information for any portion of the first selectively switched communication link that runs from the foreign exchange to the customer selected destination using the foreign exchange number as an identification of point of call origin.

18. A method as in claim 16, further comprising:

recording billing related information for any portion of the second selectively switched communication link that runs to the foreign exchange; and recording no billing charge for any portion of the second selectively switched communication link that runs between the foreign exchange and the local exchange.

19. A method as in claim 1G, wherein the local exchange and the foreign exchange are elements of a public switched telephone network.

20. A method as in claim 19, wherein the public switched telephone network is an advanced intelligent network having call processing information stored in a central database and accessed by the local and foreign exchanges via an interoffice signaling network.

21. A method as in claim 16, wherein the step of detecting an outgoing foreign exchange service call comprises:

detecting an outgoing call from the communication link serving the foreign exchange service customer; and detecting a predetermined trigger event as an indication of a request for foreign exchange service.

22. A method as in claim 21, wherein the step of detecting a predetermined trigger event as an indication of a request for foreign exchange service comprises detecting input of a predetermined access code by a caller.

23. A method as in claim 21, further comprising:

detecting another outgoing call from the communication link serving the foreign exchange service customer; and in absence of detection of the predetermined trigger event, providing a third selectively switched communication link for said another outgoing call, without use of the foreign exchange number in call processing.

* * * * *